United States Patent [19]

Wessner, Jr.

[11] Patent Number: 4,778,060
[45] Date of Patent: Oct. 18, 1988

[54] TIRE PROCESSING SYSTEM

[75] Inventor: William J. Wessner, Jr., Akron, Ohio

[73] Assignee: The Uniroyal Goodrich Tire Company, Akron, Ohio

[21] Appl. No.: 781,375

[22] Filed: Sep. 30, 1985

[51] Int. Cl.[4] .................... B07C 3/14; B05C 9/12; B29D 31/00; G06K 9/00

[52] U.S. Cl. .................................... 209/3.3; 118/320; 118/668; 118/698; 156/110.1; 209/538; 209/564; 209/583; 358/101; 364/468; 382/8; 425/29

[58] Field of Search ......... 209/3.3, 538, 583, 563–566; 156/110.1, 111, 130.5; 235/462, 463, 470, 471; 250/566; 358/101; 364/468, 478; 382/8, 36; 425/29, 90; 118/320, 668, 695, 698; 264/130

[56] References Cited

U.S. PATENT DOCUMENTS

| | | | |
|---|---|---|---|
| 1,850,238 | 3/1932 | Maynard | 118/320 |
| 2,487,111 | 11/1949 | De Koning | 118/320 |
| 2,930,345 | 3/1960 | Jacobsen et al. | 118/668 |
| 3,761,725 | 9/1973 | Meyer | 235/462 X |
| 3,777,702 | 12/1973 | Fitzgerald | 118/668 |
| 3,801,775 | 4/1974 | Acker | 235/471 X |
| 3,801,957 | 4/1974 | Hogan | 382/8 |
| 3,895,716 | 7/1975 | Ugo | 209/564 |
| 3,902,047 | 8/1975 | Tyler et al. | 235/471 |
| 3,930,141 | 12/1975 | Koyama et al. | 382/61 X |
| 4,072,928 | 2/1978 | Wilder | 382/8 |
| 4,168,133 | 9/1979 | Burkhardt | 198/357 X |
| 4,249,661 | 2/1981 | Lem | 209/564 |
| 4,285,897 | 8/1981 | Zakaria et al. | 156/110.1 X |
| 4,339,745 | 7/1982 | Barber et al. | 382/8 |
| 4,401,892 | 8/1983 | Peters | 250/566 |
| 4,430,958 | 2/1984 | Boggs | 118/668 |
| 4,611,380 | 9/1986 | Abe et al. | 118/698 X |

FOREIGN PATENT DOCUMENTS

| | | | |
|---|---|---|---|
| 1938537 | 2/1970 | Fed. Rep. of Germany | 118/320 |
| 3014500 | 10/1981 | Fed. Rep. of Germany | 118/695 |
| 0210431 | 6/1984 | Fed. Rep. of Germany | 209/583 |
| 60-144235 | 7/1985 | Japan | 425/29 |
| 0310817 | 10/1971 | U.S.S.R. | 118/320 |

Primary Examiner—Robert B. Reeves
Assistant Examiner—Edward M. Wacyra
Attorney, Agent, or Firm—Alan A. Csontos; Alfred D. Lobo

[57] ABSTRACT

An apparatus for sorting tires according to an alphanumeric code printed directly on the tread surface of each tire. Green (uncured) tires are supplied on a feed conveyor, single file, to a receiving station of a tire painting machine (tire painter), and each is elevated, then indexed to a painting station (booth) where the green tire is to be painted, inside and outside, before it is taken to a curing press. While in the elevated position in the booth, the code is optically read by a line-scan camera system, before the tire is painted. The information read is stored and processed by a microprocessor after it locates the code which determines how the tire is to be sorted, and disregards another production code not pertinent to the task at hand. A first programmable controller (PC) locates the horizontal center line of the tire, indexes to the next of three station in the painter on cue, and imparts rotation to the tire so that the camera system can perform its functions. A second PC generates a process signal indicating the availability of a space on a main conveyor which supplies plural sorting conveyors, and also generates a signal to eject a tire in a designated occupied space on the sorting conveyor, into a designated chute for a preselected tire.

3 Claims, 5 Drawing Sheets

TIRE PROCESSING SYSTEM

BACKGROUND OF THE INVENTION

This invention relates to sorting tires according to a code assigned to a tire manufacturer by the Department of Transportation (DOT code), which is written in alphanumeric characters on a tire's outside circumferential surface. The code specifies pertinent details about the tire, and the sorting system sorts the tires according to one or more of the details of particular interest. For example, automobile and truck tires, which carry the alphanumeric code are sorted by the system which executes the same reading function a human would, were he to perform the same task.

More particularly the system of especial interest herein, is one for sorting green, that is uncured or unvulcanaized, tires which are presented to a tire painting machine in a profusion of sizes. "Green" tires are those which are to be cured by vulcanization in vulcanizing molds. The code may also identify the tire building machine on which the tire was constructed, and other vital data.

This system is peculiarly adapted to sorting tires which are desirably also capable of being sorted by a human. Thus, the system is to be used where a "bar graph", bar code, or magnetic encoding of the article has been ruled out, for one reason or the other. For example, though a bar code has excellent machine readability it would require a new tag to be placed on the tire, the tag would then have to be located before it is read, and the reliability of the system would hinge upon the conscientiousness of the tire builder who would be required to place the tag in a specified location, duly affixed without wrinkles, or stretch distortion, etc. Moreover, the bar code would be only machine readable even if it was directly inked on the tread, assuming it could be inked with a sufficient lack of distortion. Such a set of bar codes and magnetic codes would not be easily readable by purchasers of the tires who would likely disapprove of them.

The foregoing are the practical circumstances which surround the sorting of green tires which must be routed to particular curing presses. After the tires are cured, they retain the coded legend and can be checked by a human, if the need arises. This system is limited to the use of a line-scan camera which optically reads an alphanumeric code and uses the information through a series of logic circuit means, to eject designated articles from a conveyor onto which the tires to be sorted are deposited.

Line-scan cameras of the type used are disclosed in U.S. Pat. Nos. 2,981,877; 3,015,048; 3,064,167; 3,108,359; 3,117,260; inter alia, the disclosures of which are incorporated by reference thereto as if fully set forth herein, and the cameras are commercially available as CCD Line-Scan Models CCD 1100, 1300, and 1400.

In the particular instance where an assortment of green tires in different sizes are to be sorted, the sequence of events in a tire plant should be noted. A tire is constructed on a tire building machine, after which it is placed on a conveyor which conveys it to a tire painting machine where inside and outside tire paints are sprayed onto the tire. Many other tires of different sizes and shapes are also placed on the same conveyor, all of which tires are to be painted with the same tire paints before the tires are vulcanized.

Tire paints are so termed because a thin film of a liquid dispersion is painted, then dried on the green tire. Without tire paints a vulcanized tire could not be removed from the vulcanizing mold without the tire being damaged. Such tire paints typically include a rubber latex, wax and carbon black, as disclosed for example in U.S. Pat. No. 4,329,265.

The tire painting machine is typically a paint spray booth in which elevatable spray guns are positioned to spray the paint on the inner surfaces of a tire, which inner surfaces are to be contacted with a pressurized heated bladder in the curing press, and on the outer surfaces of the sidewalls of the tire. Before the tire is painted, it is picked up by its upper bead, then rotated just before, and during the time when paint is sprayed from the guns. Further relevant details of the operation of the tire painting as it relates to providing information for the sorting of tires will be set forth hereinafter. The inner surfaces of the curing molds are also painted, not necessarily with the same paint, to facilitate release of the patterned tread from the mold.

After the tires are painted, they are deposited on a conveyor and mechanically sorted according to the inside diameter of their central bead openings, as described in U.S. Pat. No. 3,159,278. In many tire plants, green tires are sorted by humans who read the alphanumeric codes on the tread, then route the tires to be cured in the appropriate curing presses. The advantages and benefits of performing such a tedious and error-prone task by machine are evident.

Towards this end, several attempts have been made in the prior art to sort tires, as for example, those disclosed in U.S. Pat. Nos. 3,460,119 and 3,895,716, inter alia. But no prior art system was predicated upon the basis that it was to read a code which was printed by existing printing equipment, using conventional white ink to print an alphanumeric code with a standard character font on the tread, and without adding any tags or tape to the tire. More particularly, it was decided to read an existing code which consisted of alphanumeric characters of different sizes, only some of which were pertinent for the sorting task. Most notably, having made the decision to read the alphanumeric code, it appeared cavalier, or worse, to elect to read the code in a spray painting booth where visibility was never going to be all it should be.

Yet, this is precisely what the system does in the first of several steps delineated in greater detail hereinbelow, to provide a reliable and low cost method of sorting any article of arbitrary shape which can carry an alphanumeric code which can be read by a stationary line-scan camera, provided the article is to be subjected to a processing step, analogous in its procedural aspects to the painting step herein.

SUMMARY OF THE INVENTION

A sorting apparatus is disclosed which sorts tires according to an alphanumeric code carried by them, which code is printed at predetermined intervals, directly on the tread of each tire. The code is optically read by a line-scan camera. The information is processed by a microprocessor which controls the discharge of tires on a conveyor belt from which they are ejected according to the sets into which the tires have been sorted. A system using the apparatus specified herein may be adapted to any situation where an article is to be identified by an alphanumeric code, transfered to a processing station where it is processed, then transferred to an output station from which it is discharged to a main conveyor which supplies sorting conveyors.

It is a general object of this invention to provide a system which is used for the identification and sorting of tires having different characteristics, the articles being identified by an alphanumeric code printed on a surface of the tire within the field of view of a stationary line-scan camera which reads the code. The camera provides information stored in a microprocessor MP having a first memory means which identified the code. After the tire is released from an output station where the code is read, a first programmable controller (first PC) including a second memory means sends a message to a second PC including sorting system controls and a third memory means, indicating the tire is in position on a conveyor means from which it can be sorted. The second PC requests the tire code from the MP which provides the information. With this information the second PC finds an open space on the sort line, releases the tire to the sort line, and sends a message to the first PC indicating the next tire can be moved to the output station.

It is a specific object of this invention to provide a system for sorting green tires issuing from a tire painting machine ("tire painter") having plural stations, the flow of tires to be sorted being controlled by the slowest operation at any of the plural stations.

It is also a specific object of this invention to provide a system in which a stationary line-scan camera optically acquires an image of an alphanumeric code printed on the tread of a tire, after the first PC measures the height of the tire which is picked up by its upper bead in the receiving station of the tire painter; when the tire is moved to a second station (the paint station) of the tire painter, the first PC sends a message to the MP in communication with the first PC, giving the MP the center line of the tire rotatably held in a horizontal attitude; on receipt of the message from the first PC, the MP begins acquiring information from digitized optical images transmitted by the camera system on the tire painter; the camera scans the tire while it is rotated about 1.5 times, reading defined portions of a zone symmetrically disposed about the center line of the horizontal tire; the MP stores this information then processes it to identify the tire code; asynchronously, the paint is sprayed onto the tire completing the painting cycle, after which the tire is indexed to the output station; the first PC sends a message to a second PC, indicating a tire is in position for the main conveyor to accept it in an available space; the second PC requests the tire code of the tire in the output station from the MP; the second PC finds an open space on the sort line; the second PC generates an ejector signal which is transmitted to the appropriate sorting conveyor at a chute preselected to accept the designated tire; the tire is released from the output station, and the second PC sends a message to the first PC indicating that the next tire may be moved to the output station; the tires on the conveyor are then ejected at preselected locations, thus being sorted.

BRIEF DESCRIPTION OF THE DRAWINGS

The foregoing and other objets and advantages of my invention will appear more fully from the following description, made in conection with the accompanying drawings of preferred embodiments of the invention, wherein like reference characters refer to the same or similar parts throughout the several views and in which.

DETAILED DESCRIPTION OF A PREFERRED EMBODIMENT

Figure 1:
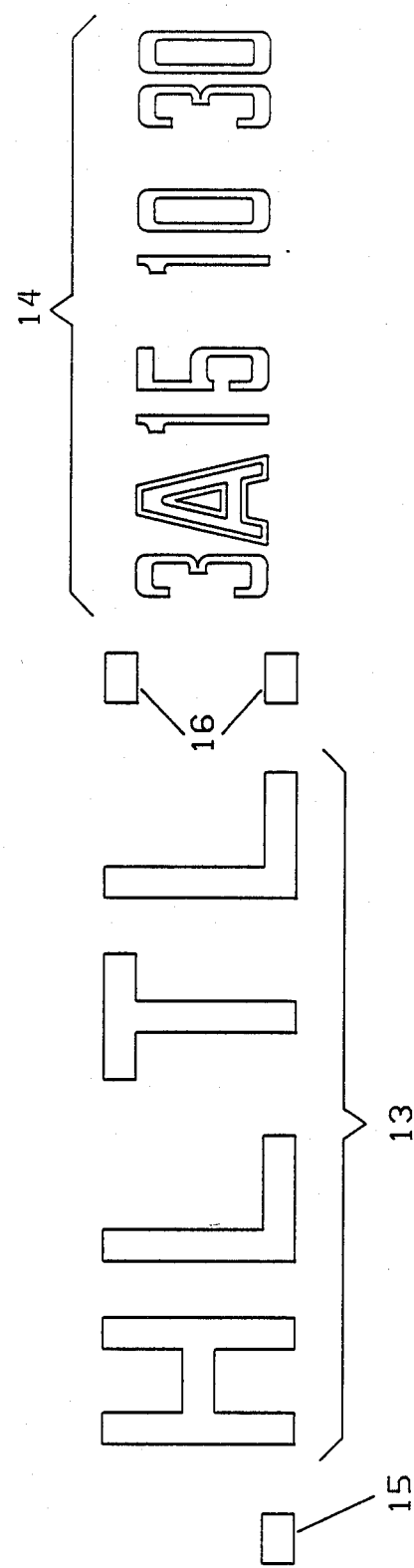
FIG. 1 depicts the tread of a tire which is printed with a white paint to form characters which provide information about the tire.

In a preferred embodiment of the invention, the system is used to sort tires ranging in size from about 12" i.d. (inside diameter of the bead)×20.1" o.d. (outside diameter to opposite outside surfaces of the tread)×7.9" high, used on small passenger cars, to about 16.4" i.d.×31.4" o.d.×22.5" high, used on trucks. The tread in each case is directly printed in white ink with a legend including an alphanumeric code (HLTL) in relatively larger characters than another production code (3A151030), printed intermediate the larger letters which are printed repetitively, illustratively shown in FIG. 1.

Only the larger characters are used for sorting, and all references herein to the "alphanumeric code" or "the code" are to the group of four large characters. The particular code illustrated herein is in letters only; it may also be in numerals only; or, in any sequence of letters and numerals. The code, indicated by reference numeral 13, is 3" high×2" wide with 0.5" wide face. All upper case letters are in solid font style. The height and width of the characters vary as follows:

Height: +3/16", −3/32"
Width: +5/32", −5/32"

The four letter code is arranged in an 11" long pattern which is repeated every 24" along the circumferential center line of the tread. Additional information, in the smaller font indicated by reference numeral 14, must be ignored as it is irrelevant for the purpose at hand, namely sorting tire tires. Also to be ignored are interrupted four letter codes, interrupted because of a splice in the tread, because the tread is continuously printed with the code before it is wrapped around the carcass of a tire.

Though any letter from A through Z and any numeral from 0 to 9 may constitute the four letter code, to avoid confusion between certain letters and numerals, for example I and 1, O and 0, S and 5, etc., the letters G, I, O, Q, S and Z are not used in the code. Even with these letters omitted, the possible recognizable permutations of 20 alpha and 10 numeric characters is 810,000, which is more than adequate.

Reading of the code is accomplished with a Fairchild CCD Line-Scan Camera which includes the camera body and lens of choice, and a control unit. A line scan array in the camera senses a line of optical information and produces an analog waveform proportional to the brightness of the image. When motion is applied to the object being sensed, a complete picture or series of line-scan outputs is generated. This system is used for velocity measurements and recognition sorting. The control unit comprises a subsystem which permits precise measurements and sensing of optical data.

The tire is illuminated for the camera by any convenient form of electromagnetic radiation. Usually the electromagnetic radiation will be light in the visible range (i.e. about $10^{12}$ kilohertz) but other electromagnetic frequencies can be employed, particularly those in the ultraviolet and the infrared ranges. The radiation employed will be chosen with due regard for the reflective properties of the code, the background against which it is printed, and the conditions under which it is to be read, as well of course, the relative costs and safety of appropriate emitter and transducer means required to read the code.

The camera control unit provides four principal functions: video output control, video data rate control, exposure control and the camera power supply, details of which are available from the manufacturer.

Figure 2:
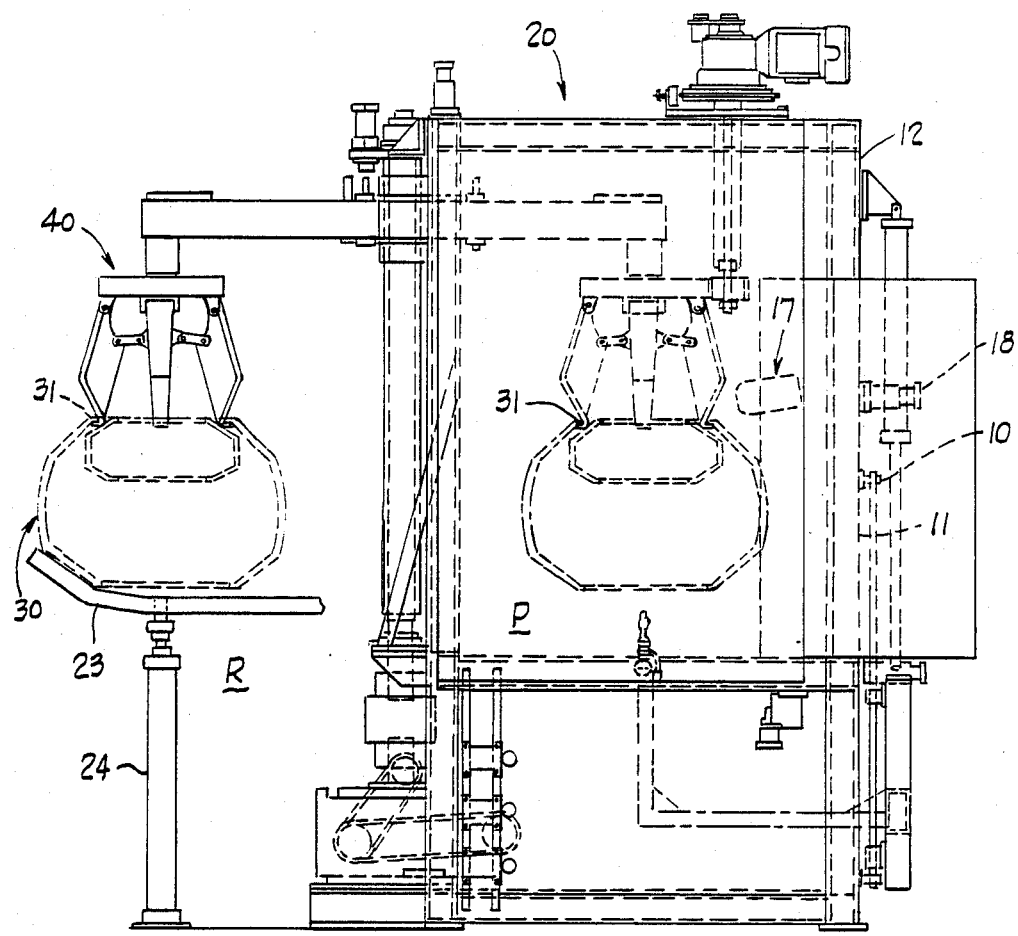
FIG. 2 is a side elevational view of a tire painter in which a green tire is painted at one of three stations before it is discharged for sorting.
Figure 5:
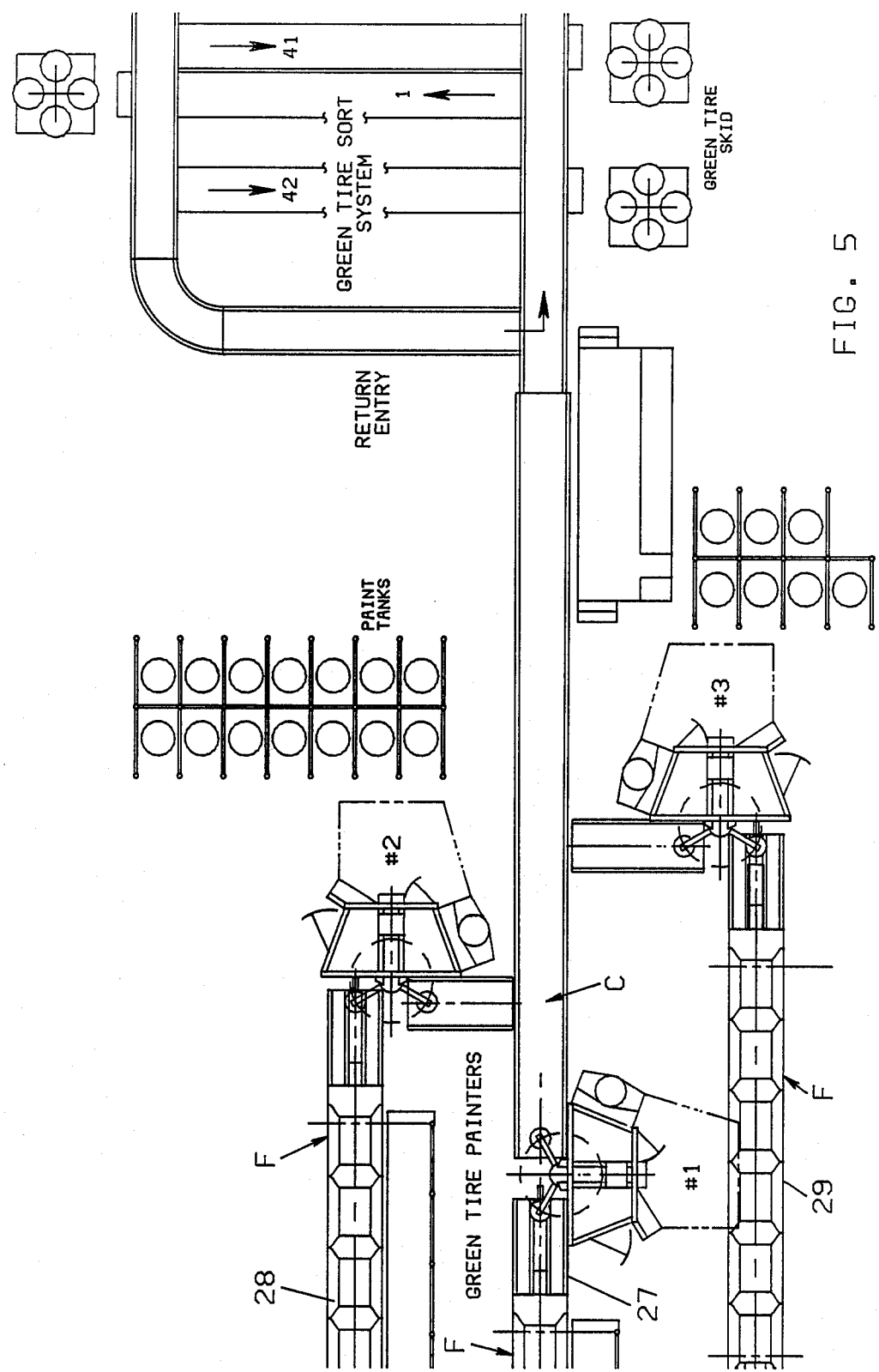
FIG. 5 is a plan view schematically illustrating the use of three tire painters in a tire plant in which green tires are fed to the tire painters on feed conveyors, and the painted tires are discharged onto a main conveyor which supplies sorting conveyors from which the tires are ejected into preselected groups.

Referring to FIG. 2, there is schematically illustrated a camera 10 located behind a transparent panel 11 in the wall 12 of a tire painter, indicated generally by reference numeral 20. The tire painter includes a receiving station R where a tire 30 is received from a feed conveyor F (as shown in FIG. 5), a painting station P, and an output station O, to each of which the tire 30 is sequentially indexed before it is discharged onto a main conveyor C as a painted tire.

The feed conveyor F delivers the tire onto an arcuate platform 23 supported for elevation on a fluid-actuated cylinder means 24. After a tire is received at the receiving station R it is "chucked up" by its upper bead 31 in a gripping means 40 which can rotate the tire about its vertical axis normal to the horizontal plane in which the tire is held.

From the receiving station the tire is indexed to the painting station where it is rotated before, and while it is painted. The spray guns 18 are positioned centrally within the tire, and above and below it so that the inner surfaces of the tire, and the outer surfaces of both sidewalls are simultaneously painted. An exhaust fan 17 exhausts excess paint in a direction away from the camera's lens to minimize interference with the camera's ability to read the four letter code. The tire painter such as the one used is conventional, details of which are well known and need not be recited in greater detail herein.

The speed at which the sorting operation functions is directly controlled by the slowest operating time of a station of the tire painter, which paints a tire about every 5 secs. Thus, the four letter code must be read and all basic data (plus the use of a buffer) must be acquired within a time frame of 5 secs.

Figure 3:
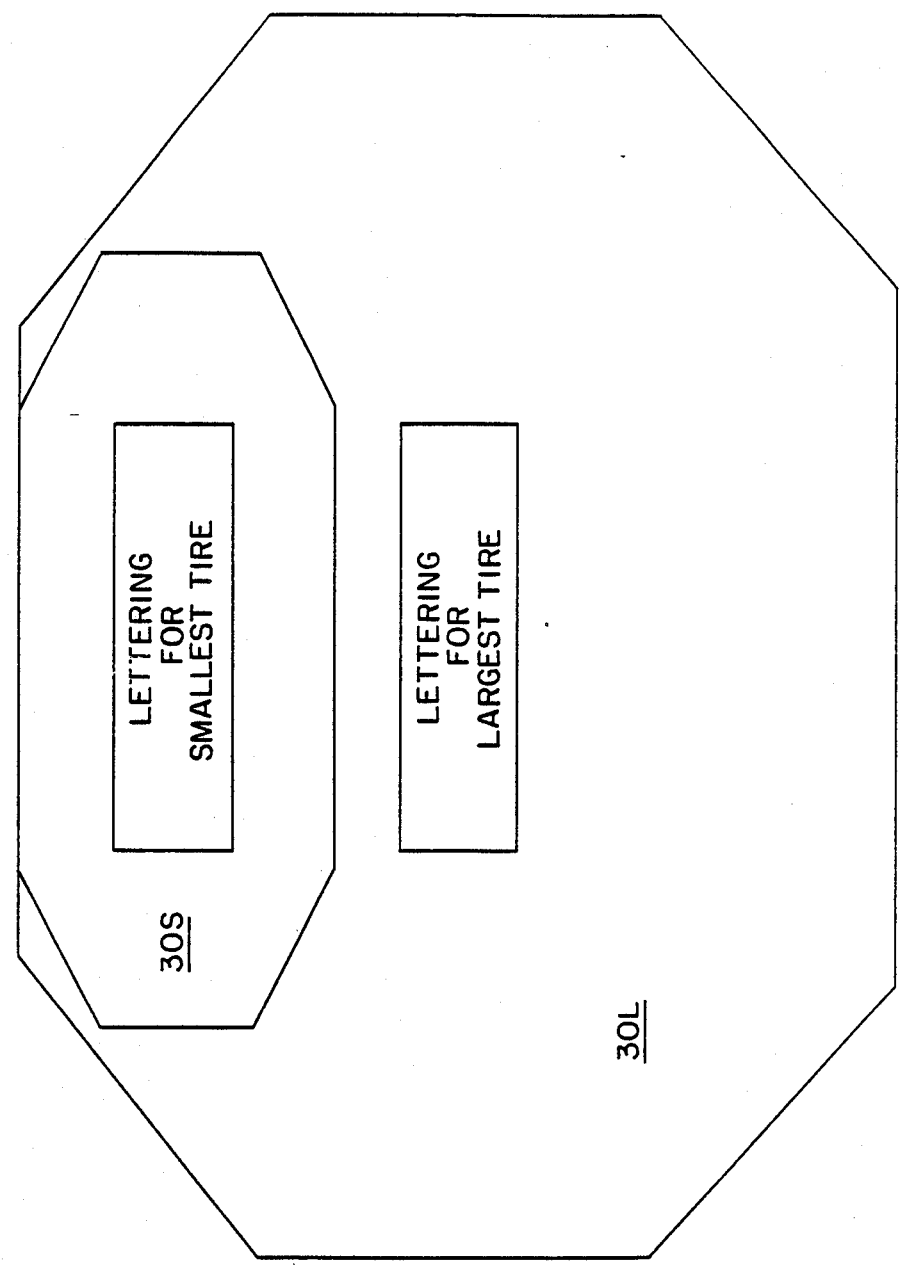
FIG. 3 schematically illustrates the largest and smallest tires among the mixture of sizes fed to the tire painter to be painted, each tire being held in an elevated position to be painted, the upper edge of the elevational profile of each tire being indexed to the same horizontal reference line. The relative positions of the alphanumeric code at the center line of each tire's tread outline a "window" which the camera lens "sees".

Tires are presented automatically to the receiving station in a horizontal attitude but the code may have the letters right-side-up, or up-side-down. A front elevational view of a small and a large tire in the range of sizes to be read are shown superimposed one upon the other, in FIG. 3, to show a window within which the four letter code must be positioned if it is to be read. On the large tire 30L the four letter code 21 is positioned symmetrically about the horizontal centerline C/L of the tire, and as shown occupies a space 11" wide ×3" high at the lower limit of readability of the camera. On the small tire 30S another four letter code 22 is positioned symmetrically about its horizontal axis, and at the upper limit of readability of the camera. Though the tires need not be positioned so their center lines coincide, the C/L of the code must be determined for the camera before it can initiate progress through the steps required to read the code, for the reasons set forth hereinbelow.

The reading process comprises (a) finding the characters to be read, and (b) analyzing the image which is procured after step (a).

The finding task can be divided into a vertical location and a horizontal location. Vertical indexing is easily achieved using existing equipment on the tire painter. The height of each tire is already measured by the tire painter entrance elevator pulse counter for setting the spray guns; hence the vertical location of all printed characters is already available for a logic control system and for aiming the camera. Better camera focusing and shorter pixel processing times are the results of the easy vertical index.

Horizontal indexing deals with sorting out the green tire codes only and these are easily discernible because of their relatively large size.

The first step of image analysis is verification of certain critical items. Verification is aided by adding three, small index marks, a square period 15 at the beginning of the code, and vertically spaced apart square periods (colon) 16 at the end of the code. These marks provide (1) right-side-up vs up-side-down indexing; (2) increase in the light level during location of the four large characters; (3) distance fixing for velocity and acceleration to ensure correct horizontal proportions, and (4) for integrity of code volume thus eliminating incomplete and oversized codes at tread splices.

Analysis of image depends on quality of image with an image procurement station being provided by the paint station P where the gripping means 40 has a driven rotating chuck with a coordinated variable speed to present an essentially constant surface speed to the paint guns, and coincidentally to the camera. The line-scan camera electronically unwraps the tread for full analysis. The high speed of operation of the line-scan camera permits image acquisition prior to the painting operation and avoids distortion resulting from curvature and overspray.

Figure 4:
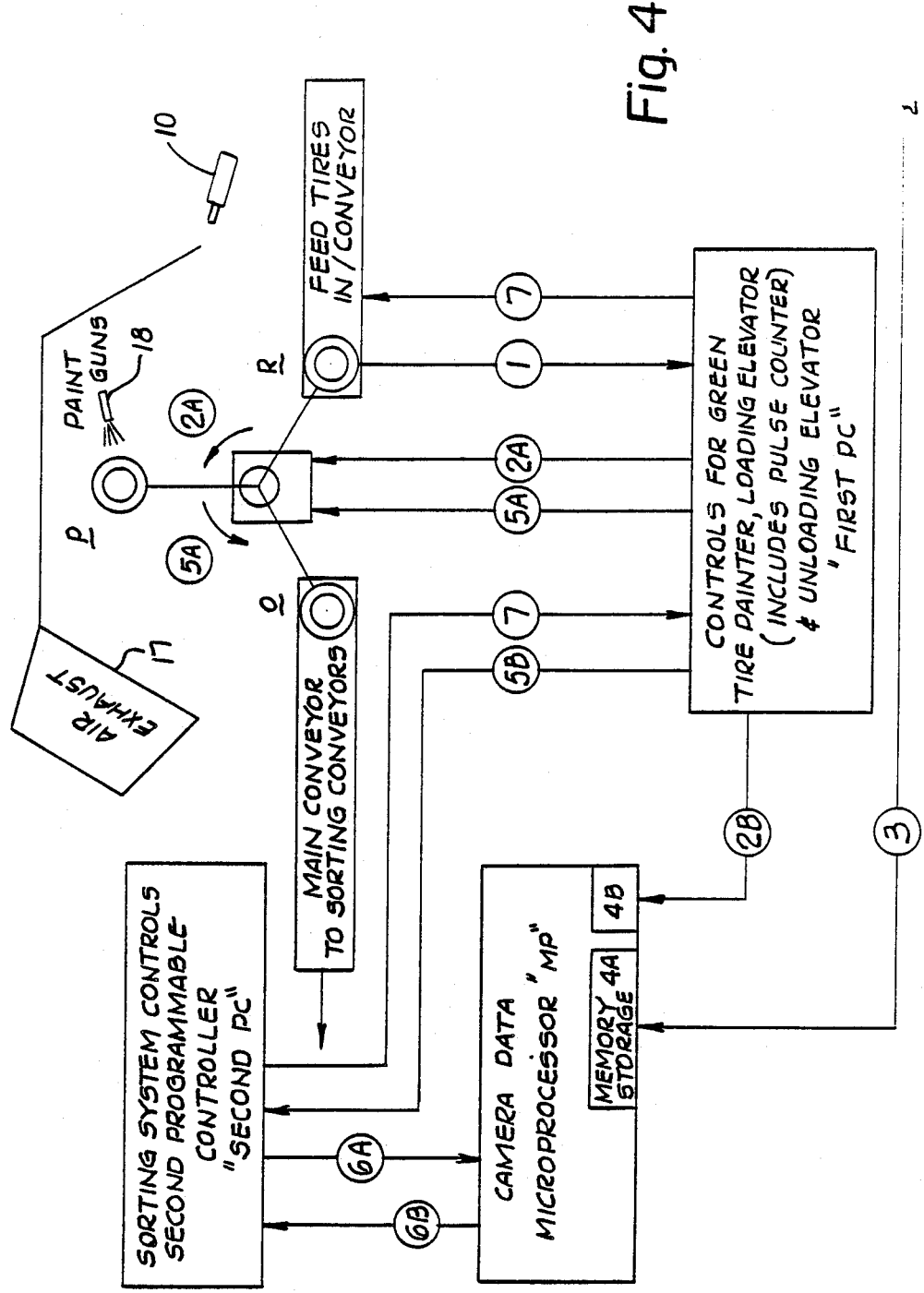
FIG. 4 is a block diagram schematically defining the various operations carried out by the apparatus of the invention at the behest of appropriate software.

Referring to FIG. 4 there is shown a block diagram in which the essential steps of the system are defined.

A tire is delivered single file on a feed conveyor to the receiving station R and the painter control means measures the height of the tire by counting the number of pulses generated by the elevator and subtracting from the fixed elevation of the upper bead. The height of the tire is also used to set the height of the paint spray guns. The height of the tire is divided by two to find the center line and the center line signal is transmitted by the first programmable controller (first PC) to the microprocessor MP which includes camera data processing means. As soon as the height of the tires is measured, the tire is indexed to the painting station P. Software to execute the foregoing functions, communicating signals from the appropriate mechanisms to the first PC is represented by the line designated by reference numeral 1.

Then the first PC, which includes painter control means, signals that the tire is to be indexed to the painting station by signal, represented by the line 2A, and rotated. The action arrow 2A simply indicates the direction of radial (120°) movement when the tire is indexed as a result of the signal 2A from the first PC. During the first 1.5 rotations of the gripping means 40, the video camera is triggered to acquire the image.

The video camera sends data signals (pixels) to the MP, this camera function being represented by line 3, and electronically unwraps the code before it can read it, while the tire rotates the first 1.5 rotations. The MP processes the image and looks for the first square period, and the colon at the end of the code. If the image is not right side up, the microprocessor decoding the optical image of the alphanumeric code will electronically invert the representative data signals to properly orient the code image.

The circumferential distance between the square period and the colon is predetermined and fixed for a particular camera system in accordance with its performance parameters. This distance permits a velocity check for accurate signal procurement, and sets the angular velocity of the tread of a tire in the rotating gripping means. This distance also prescribes the space to be occupied by the alphanumeric code, and coincidentally permits a check to ensure that an erroneous code is not read because the tread happens to be spliced at the code.

For example, referring to FIG. 1, if the tread was spliced so that the code read ".HTL:" because all or most of the letter L was missing, the distance between the period and the colon is foreshortened. If the code read ".HLTTL:" because the splice added an additional letter (say), the distance is lengthened. In each case the MP discriminates against the erroneous code and looks for one which has the correct distance between the period and the colon.

Knowing the center line of the tread, the MP analyzes pixels 2" above the center line and 2" below the center line, and deletes the central 2" wide band for search purposes, looking for the code to be read by summing the illumination, thus resulting in deletion of the entire small code. Upon locating the central portion, only the large letters and numerals of the code are read, which provides the discernment of size in the code. The acquired mage is processed in the MP and the identification is made by comparing with images stored in storage means represented by box 4A of the MP. The foregoing image recognition steps are carried out by software represented by the box identified by reference numeral 4B in the MP.

The spray guns are actuated, the tire is painted and then indexed to output station O, in a step executed by software represented by reference numeral 5A.

The painter control means (first PC) transmits a signal to the the sorting means PC (second PC) indicating that the tire is ready to be discharged to the main conveyor which supplies the sorting conveyors. Software to execute the foregiong functions is represented by the line identified by reference numeral 5B.

The sorting means PC (second PC) requests the camera data processing means (MP) for the tire code of the tire in the output station O; this inquiry by software is represented by the line identified by reference numeral 6A.

The MP delivers the information to the second PC, this response being represented by the line 6B, and the information is transmitted to an ejector means at the particular chute (not shown) at which the tire occupying the occupied space is to be ejected.

The sorting means (second PC) identifies an available space on the main sorting conveyor which leads to plural sorting conveyors, and transmits this message, with software represented by the line 7, to the painter control means (first PC) which drops the tire in the designated available space. As soon as this is done, the first PC registers the information that the receiving station R of the tire painter is ready to accept another tire, and instructs the station R to receive it, as indicated by the line 8.

Details of how to execute each of the steps with appropriate software to communicate with means to actuate the apparatus disclosed are within the skill of a program writer once he is told what the main steps are to be.

Referring to FIG. 5 there is illustrated a typical process flow of tires 30 which are painted in three tire painters 20 indicated by numerals #1, #2 and #3 respectively which discharge painted tires onto a main conveyor belt C. The painted green tires are conveyed to a green tire sort system where they are sorted.

More specifically, green tires to be painted are deposited automatically, in a flat or horizontal position, single-file, onto conveyor 27 which feeds #1 tire painter. In an analogous manner, tires are fed on conveyors 28 and 29 to tire painters #2 and #3 respectively.

As described hereinabove, each tire painter has a video camera system or optical scanning unit 10 which 'looks in' at the paint station P of the tire painter. The tire painter is provided with adequate illumination from lights and an exhaust system (not shown) which vents overspray away from the lens of the camera to afford good visibility. The tire at P is rotated just before the spray guns are actuated, and during the first about 1.5 rotations the alphanumeric code is read by a subsystem which generates a multiplicity of discrete data signals representing the code, which signals are processed to identify signals representative of the various tires to be sorted.

The video signals are initially in analog form and are digitized by an A/D converter. The signals generated are connected to output relays. The information signal from the second PC is supplied as a control signal to an ejector means in order that said ejector means can selectively eject a preselected and designated tire.

Stepping the cycle is inititated when a tire is positioned in the receiving station R. A "start of scan" pulse is provided by the MP when the tire is indexed after step 2A. The "clock" and "video data" signals for the camera are built into the MP.

Each of the PCs is linked to the MP with a conventional serial link and the MP communicates with a video terminal and keyboard for changing programs. Final processing, or sorting signals computed in 2nd PC are output to relays which in turn drive ejector means for effecting the desired sorting.

It should be appreciated that while each of the PCs and the MP may be separate entities as used herein, they may also be subsystems of a single digital computer which can carry out the same functions.

It will now be appreciated that any article bearing an alphanumeric code which may be read after it is located, with unhelpful or unnecessary portions of the code disregarded, may be sorted with appropriate modifications of the foregoing system. In particular, cured tires may be sorted at a uniformity machine by reading a code on the tread as well as one on the sidewall; or cured tires may be sorted at a white-wall buffing machine where the white walls are dressed; or at an airvent trimming machine where spiny protrusions of rubber left by air vents on the curing molds are trimmed.

I claim:

1. A system for process flow of tires according to an alphanumeric code carried by each tire, said code being printed on the tread of each tire circumferentially so that letters and numerals of the code are substantially symmetrically disposed about the horizontal center line between the edges of the tread, said system comprising,
   (a) a first programmable controller (first PC) means including control means for
      (i) locating the horizontal center line of said tread,
      (ii) indexing said tire in a horizontal disposition to an adjacent processing station,
      (iii) imparting rotation to said tire about its vertical axis to present an essentially constant surface speed; and,
      (iv) means associated with said first PC to generate one process signal indicating that said tire in an output station is ready to be discharged to a main conveyor;
   (b) a line-scan camera for electronically transmitting digitized optical images acquired by said camera;
   (c) microprocessor means (MP) including
      (i) storage means for storing data signals as they are generated, thereby generating a stored batch of tire data corresponding to said tire, and,
      (ii) batch processing means for processing said batch of data to generate another process signal indicating that said tire has been identified independently, including locating said code;
   (d) a second programmable controller (second PC) means including
      (i) space availability process signal generating means for determining what spaces are available for occupancy on said main conveyor which supplies plural sorting conveyors, and,
      (ii) ejector process signal generating means to eject a tire in a designated occupied space in transit on said main conveyor to a sorting conveyor.

2. The system of claim 1 wherein said first PC includes a painter control means, said processing station is a painting station, and said tire is rotated a predetermined number of times prior to actuation of spray guns at said painting station.

3. The system of claim 2 wherein said alphanumeric code is a four character code including, in addition, means to identify the disposition, if inverted, of said code, said means including a single dot character immediately preceding said code, and a pair of dot characters in vertically spaced apart relationship immediately succeeding said code.

* * * * *